Figure 1:
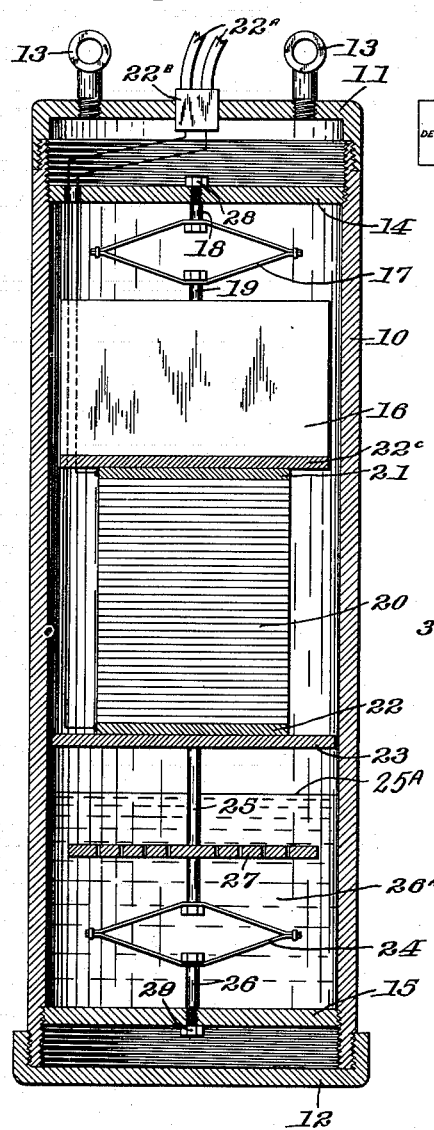

Dec. 15, 1936.   L. J. NEUMAN   2,064,489
VIBRATION DETECTOR
Filed May 26, 1932

LEONARD J. NEUMAN
INVENTOR

BY  R. J. Dearborn
HIS ATTORNEY

Patented Dec. 15, 1936

2,064,489

UNITED STATES PATENT OFFICE 2,064,489

VIBRATION DETECTOR

Leonard J. Neuman, Houston, Tex., assignor to The Texas Company, New York, N. Y., a corporation of Delaware Application May 26, 1932, Serial No. 613,705

4 Claims. (Cl. 177—352)

My invention relates to vibration detectors, more particularly to devices adapted to ascertain the magnitude and frequency of elastic or sound waves, such as earth tremors or vibrations which may be either naturally or artificially produced. These detectors belong to that class of instruments generally designated by the term seismograph and are particularly applicable in the surveying of underground strata for the determination and location of ore or petroleum deposits. The principal object of my invention is the provision of a device of this type which will be of simple construction and particularly efficient in the detecting of waves having frequencies between predetermined limits.

A further object of my invention is the provision of a detecting device which will be securely housed within a leak-proof container or casing capable of withstanding high pressures so that it may be placed, for instance, in drilled wells where pressures of several thousand pounds per square inch may be encountered.

A still further object of my invention is the provision of a suspension means or mechanical filter which will be selective and responsive to any desired range or band of frequencies so that extraneous noises or virbrations having other frequencies will not be detected or recorded.

Vibration detectors of several types have been used in the past but it has been found that those detectors which are sufficiently sensitive to record weak signals such as those produced by an artificial explosion many miles distant have been also responsive to vibrations or waves caused by outside disturbances such as wind, the movement of heavy bodies, etc. On the other hand the instruments which are not affected by these extraneous waves are not sufficiently sensitive for the purposes for which they are provided. In the carrying out of my invention I have provided a detecting instrument which is extremely sensitive for the detecting of sound waves of predetermined frequencies but which will not be affected by waves or vibrations having frequencies outside of the limits for which it is designed.

In the investigating of sub-surface strata it is especially essential that the detecting device be sensitive to waves having frequencies between narrow limits. It frequently happens that many other waves arrive at the recording station simultaneously with the arrival of the desired waves. For instance, when it is desired to record reflected waves, a detector which is not mainly sensitive to the frequencies of the reflected waves may be also affected by diffracted or refracted waves, by the direct and air waves, or by noise such as produced by wind in trees, traffic, grazing cattle or machinery.

The fundamental principle involved in my invention lies in the provision of a resistance member the resistance of which varies with the pressure thereon. This resistance member may advantageously be formed of a stack of carbon plates of proper quality and dimensions such as is commonly known as a "carbon pile". These plates are mounted between an inertia member and the detector housing or casing which latter is adapted to be maintained in intimate contact with the medium through which the waves travel. The resistance member may be connected electrically through a transformer and an amplifier to a suitable recording device such as an oscillograph. When the detector casing is vibrated in response, for instance, to earth movements caused by the passage therethrough of sound or seismic waves, the inertia member will tend to remain at rest and the relative movement between that member and the casing will cause the pressure on the resistance member to be increased or decreased in accordance with the amplitude and frequency of the received waves. Since the electrical resistance of the carbon-pile within certain limits is directly proportional to the pressure to which the pile is subjected, the resulting variations in the electrical current through the pile may be caused to operate the recording oscillograph and in this manner a permanent film record of the waves arriving at the detector may be secured.

Figure 2:
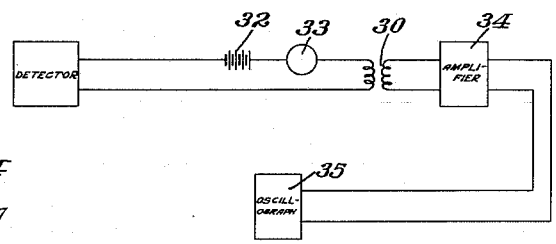
Figure 3:
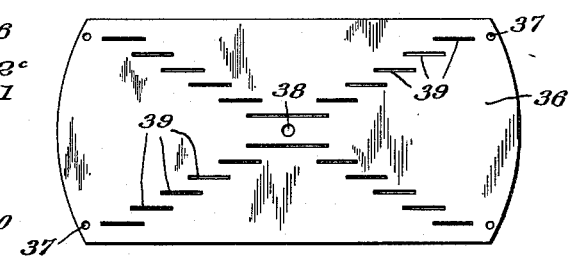
Figure 4:
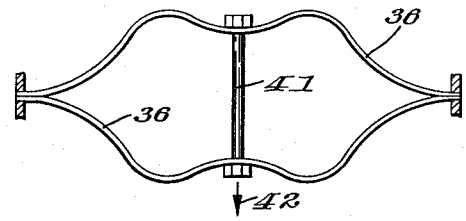
Figure 5:
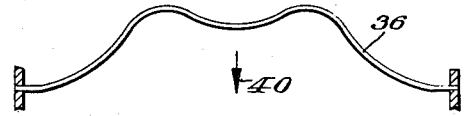

For a better understanding of my invention reference may be had to the accompanying drawing wherein Fig. 1 is a sectional elevation of a preferred form of the detector; Fig. 2 is a schematic diagram of electrical connections, while Figs. 3, 4 and 5 are detail views of a spring suspension or mechanical filter which may be used.

Referring to the drawing, the detector is shown as mounted within a cylindrical casing or housing 10 provided with upper and lower closures 11 and 12 respectively. The closure members 11 and 12 are preferably threaded to the casing 10. It is to be understood that this closed casing is to be of sufficient strength and tightness to withstand external pressures of as high as 6000 pounds per square inch such as may be encountered in deep wells. The upper closure 11 is provided with a pair of screw eyes 13 which may be used in raising or lowering the instrument into position. The upper and lower ends of the housing 10 are internally threaded for the reception of supporting discs 14 and 15 respectively.

An inertia member 16 is adapted to be suspended from the disc 14 by means of a substantially elliptical spring 17 and suitable bolts 18 and 19. A plurality of carbon plates or discs forming the carbon pile 20 are mounted between a pair of metallic contact plates 21 and 22 and suitable connecting wires 22a are connected to these plates and pass upwardly and out of the upper closure 11 through a stuffing box or packing 22b. A disc 22c of electrically insulating material is mounted between the inertia mass 16 and the plate 21 while the lower contact plate 22 rests upon a disc 23 of electrically insulating material and of a slightly smaller diameter than the inside of the housing 10 so that it may freely move longitudinally with respect thereto.

While I have illustrated the variable resistance member as being formed of carbon plates or discs, it is to be understood that other devices may be used the resistance of which varies with pressure, for example, a stack of felt or paper discs or washers moistened with a suitable electrolyte.

The disc 23 is resiliently supported from the disc 15 by means of a spring 24 and suitable bolts 25 and 26, the bolt 26 being connected directly to the disc 15. The lower portion of the housing is adapted to be partially filled with oil 25A and forms a tuning column or chamber 26A. A perforated plate 27 secured to the bolt 25 cooperates with the oil to dampen the vibrations imparted to the carbon pile and inertia member through the springs 17 and 24. As previously explained, the disc 23 fits the housing in such a manner as not to interfere with the free motion of the bolt 25 and contact plate 22 and at the same time prevents the oil and surges of air from passing upwardly into contact with the carbon plates. The bolts 18 and 26 are provided with adjusting nuts 28 and 29 respectively by means of which the tension on the springs 17 and 24 may be varied.

By means of the proper selection of the springs 17 and 24 and the adjustment of the nuts 28 and 29 the detector may be tuned to mechanical resonance to detect the sound waves having the desired frequency or range of frequencies. The size or weight of the inertia member 16 may also be varied so as to tune the detector to resonance more accurately and the volume of the oil and air in chamber 26A below the disc 23 and the size and nature of the damping plate 27 will also affect the tuning of the device. The air in the chamber 26A acts as an elastic cushion and affects the tuning, sensitivity and damping. While I have illustrated but one damping plate 27 I wish it to be understood that more than one plate may be used. For instance, one plate may be so located as to move in the oil in the lower part of the chamber 26A while another plate similar to the plate 27 may be located so as to be movable in the air above the oil. The amount of damping is further regulated by the size of the damping plates, the size and arrangement of the holes in these plates and also by the closeness with which the plate 23 fits the casing 10. The purpose of this mechanical tuning is to enable the operator to detect and record all or any part of the received seismic waves, these waves being within a predetermined group or band of frequencies and conducted to the housing through the earth after being diffracted, refracted or reflected from different underground horizons or structures, the location of which is desired. When so tuned to mechanical resonance the detector will produce variations of the same frequency and proportional magnitude in the electric current flowing through the carbon-pile and this pulsating direct current will in turn induce an alternating current of the same frequency and proportional amplitudes in the secondary of a coupling transformer 30 shown diagrammatically in Fig. 2.

In Fig. 2 the carbon-pile resistance of the detector is connected in series with a battery 32 or other source of direct current, a milliammeter 33 and the primary of the transformer 30. The secondary of the transformer may be connected through an amplifier 34 and after being properly amplified and electrically filtered if necessary the electrical current will pass to an indicating or recording device such as the oscillograph 35 where a permanent film record may be made of the incoming groups of waves. By properly adjusting the damping of the detector each wave group will be quickly damped out so as not to interfere with the accurate recording of the beginning of the next group. Several detectors may, of course, be set up at the same point and tuned mechanically in such a manner that the time of arrival of the incoming waves of different frequencies may be recorded simultaneously.

Although the springs 17 and 24 are shown only diagrammatically in Fig. 1, these members form an important part of my invention since they constitute, in effect, mechanical filters which serve to allow only waves having frequencies between predetermined limits to actuate the detector. Several different kinds may be used depending upon the type of work being done, i. e. whether diffracted, refracted or reflected waves are being recorded and in Figs. 3, 4 and 5 I have shown some types of springs which are particularly applicable for use in my detector.

In Fig. 3 the spring comprises a single flat, substantially rectangular piece of metal 36 provided with holes 37 whereby it may be attached either directly to the load or to another spring member of the same shape, as is shown in Fig. 4. A hole 38 is provided at the center of the spring and the spring may be supported at this point by means of a suitable connection such as the bolt 18 shown in Fig. 1. The spring is also provided with a plurality of longitudinal, diagonally arranged slits 39 in order to increase its response to waves of low frequency. If desired, the spring may be grooved or shaped such as is shown in side view in Fig. 5, the spring being supported at its edges and the weight applied at the center in the direction of the arrow 40 or, in order to reduce the frequency still further, two of the grooved springs may be secured together and supported at their edges while a suitable bolt 41 is secured at the centers, the load again being applied as shown by the arrow 42. The use of two similar springs connected in compound as indicated in Fig. 4 will decrease the amplitude without materially changing the resonant frequency of the spring. The band of frequencies to which such a spring will respond is controlled by the amount of arching and the compression applied. It is to be understood that other arrangements of springs than those shown may be used. For instance, several springs may be connected in series or in parallel or multiple.

Obviously, any one of several springs or combinations of springs covering a range of frequencies from 0 to 500 vibrations per second may be used in the detector shown in Fig. 1. The spring or mechanical filter is an important part of the detector since it serves to amplify and transmit only those vibrations which occur at predetermined or selected frequencies and thus prevents actuation of the detector by undesired waves or vibrations.

It should also be recognized that the device which I have disclosed is a displacement detector as in contrast with the acceleration or velocity types and will give variations in current that are proportional to elastic displacements of the medium in question. The acceleration types induce current variations that are proportional to acceleration of the elastic medium and the velocity type proportional to the velocity of this medium. The displacement type is of particular value where a knowledge of absolute or relative earth displacements is desired.

Obviously many modifications and variations of the invention, as hereinbefore set forth, may be made without departing from the spirit and scope thereof, and therefore only such limitations should be imposed as are indicated in the appended claims.

I claim:

1. In a device for detecting elastic waves, a casing adapted to be vibrated by said waves, an inertia member, resilient means for suspending said member from the upper part of said casing, said means comprising an elliptical spring disposed between said casing and said inertia member, a carbon-pile resistance located below said inertia member and in mechanical contact therewith, a second resilient means comprising a second elliptical spring for supporting said resistance from the lower portion of said casing, said first and second resilient means being responsive mainly to waves having frequencies between predetermined limits.

2. In a device for detecting elastic wave vibrations, a fluid-tight casing, an inertia element, an elliptical spring attached at one side to the upper end of said casing and having its opposite side secured to said inertia element, a plurality of discs forming a carbon-pile resistance, one end of said resistance having mechanical contact with said inertia element, and a second elliptical spring attached at one side to the lower end of said casing and having its opposite side secured to the other end of said resistance.

3. The combination with a vibration detector having a casing adapted to be vibrated in response to the reception of seismic waves, an inertia element, and a compressible electrical resistance member adjacent said inertia element and arranged between said inertia element and said casing, of means for resiliently supporting said inertia element and said resistance member within said casing comprising a pair of spring units, each of said units consisting of two normally flat spring members adapted to be secured together at their edges, the center of one of said spring members of one unit being secured to one end of said casing while the center of the cooperating spring member is secured to said inertia element, the center of one spring member of the other unit being connected to the other end of said casing and the center of the cooperating spring member being connected to said resistance member, said spring members being provided with a plurality of parallel slits arranged diagonally across said members.

4. The combination with a vibration detector having a casing adapted to be vibrated in response to the reception of seismic waves, an inertia element, and a compressible electrical resistance member adjacent said inertia element and arranged between said inertia element and said casing, of means for resiliently supporting said inertia element and said resistance member within said casing comprising a pair of spring units, each of said units consisting of two normally flat spring members secured together at their edges, the center of one of said spring members of one unit being secured to one end of said casing while the center of the cooperating spring member is secured to said inertia element, the center of one spring member of the other unit being connected to the other end of said casing and the center of the cooperating spring member being connected to said resistance member.

LEONARD J. NEUMAN.